United States Patent [19]

Els et al.

[11] Patent Number: 4,567,929
[45] Date of Patent: Feb. 4, 1986

[54] BIAS PLY PNEUMATIC TIRE TREAD WITH LATERAL NOTCHES

[75] Inventors: Ronald T. Els, Luxembourg, Luxembourg; Jacques R. Smeets, Arlon, Belgium

[73] Assignee: The Goodyear Tire & Rubber Company, Akron, Ohio

[21] Appl. No.: 614,591

[22] Filed: May 29, 1984

[51] Int. Cl.⁴ .............................................. B60C 11/06
[52] U.S. Cl. .................................. 152/209 R; 152/525
[58] Field of Search ........... 152/209 R, 209 D, 209 B, 152/330 C, 374; D12/152

[56] References Cited

U.S. PATENT DOCUMENTS 4,078,596 3/1978 Nakayama et al. ............. 152/209 R
4,281,702 8/1981 Grosch et al. ................... 152/209 R

FOREIGN PATENT DOCUMENTS 712339 7/1954 United Kingdom .

*Primary Examiner*—Michael Ball
*Attorney, Agent, or Firm*—L. R. Drayer

[57] ABSTRACT

A bias ply pneumatic tire has a tread with a rib type tread pattern including shoulder ribs at the lateral edges of the tread. The tread has grooves therein, and at each lateral edge of the tread a shoulder portion of the tire extends radially inwardly. Shallow shoulder notches are formed in each of the shoulder portions, and extend radially inwardly from the lateral edges of the tread to a depth which is substantially equal to the depth of the deepest grooves in the tread. The notches are circumferentially spaced by lands, and the ratio of the circumferential widths of the notches to the circumferential widths of the next adjacent lands is between 1:0.8 and 1:1.25.

9 Claims, 4 Drawing Figures

BIAS PLY PNEUMATIC TIRE TREAD WITH LATERAL NOTCHES

BACKGROUND OF THE INVENTION

This invention relates generally to bias ply pneumatic tires having a tread pattern including circumferentially extending shoulder ribs, and in particular, but not exclusively, to bias ply pneumatic truck tires having treads of the aforementioned type.

A typical bias ply pneumatic tire with a rib type tread has a pair of lateral tread edges which are formed on circumferentially extending shoulder ribs and at least one, and most commonly three, axially spaced circumferentially extending ribs located between the shoulder ribs. The ribs are spaced apart from one another by circumferentially extending grooves that are typically zig-zag in configuration, but the grooves may be straight.

The shoulder ribs of these prior art tires are subject to damage when the vehicle, to which the tires are fitted, is driven substantially parallel to a curb and caused to ride up on the edge of the curb, thereby subjecting a shoulder portion of the tire that is adjacent to the curb to a tearing action. Such damage can also occur to tires fitted on a trailer when a vehicle towing the trailer is turned in a very tight circle, or when a vehicle fitted with the tires leaves the edge of a highly crowned roadway.

The prior art solution to the problem of torn shoulder ribs has been to produce rib type bias ply tires having wide and stiff shoulder ribs to reduce the incidence of tear. This prior art solution results in a heat build up in the shoulder portions of the tire, and radially elongated cooling notches were placed into the shoulder portions of the tire to help dissipate the heat.

SUMMARY OF THE INVENTION

There is provided in accordance with an aspect of the invention, a bias ply pneumatic tire comprising a tread having a pair of lateral edges with shoulder portions extending radially inwardly from each lateral edge of the tread. The tread has circumferentially extending grooves therein. A pair of shoulder ribs extends circumferentially around the tire and extend axially inwardly from a respective lateral edge of the tread to one of the circumferentially extending grooves and have a maximum axial width of 17% of the tread width. Each shoulder portion has a plurality of notches therein that are circumferentially spaced apart from each other by lands. Each notch extends radially inwardly from the respective lateral edge of the tread to a depth substantially equal to the depth of the deepest of said circumferentially extending grooves. The notches and the lands have circumferential widths such that the ratio of the circumferential width of each notch to the circumferential widths of the next adjacent lands is between 1:0.8 and 1:1.25.

Preferably, the ratio of the circumferential widths of the notches to the circumferential widths of the lands is 1:1.

Preferably, all the notches have the same circumferential width, the same radial depth, and a substantially triangular radial cross-section with a base that extends axially into the respective portion for an axial distance of about 6% of the tread width.

Preferably, the tread is formed from a cap of a low modulus first elastomeric material, and each shoulder rib is supported on a base of a high tear strength second elastomeric material.

For the purpose of this invention, the terms "radial" and "radially" refer to directions perpendicular to the axis of rotation of a tire, the terms "axial" and "axially" refer to directions parallel to the axis of rotation of a tire, and "tread width" refers to the axial distance across the tread as measured from the footprint of a tire when the tire is inflated to a design inflation pressure and subjected to a rated load.

BRIEF DESCRIPTION OF THE DRAWINGS

The invention will be described by way of example only, and with reference to the accompanying drawings in which.

Figure 1:
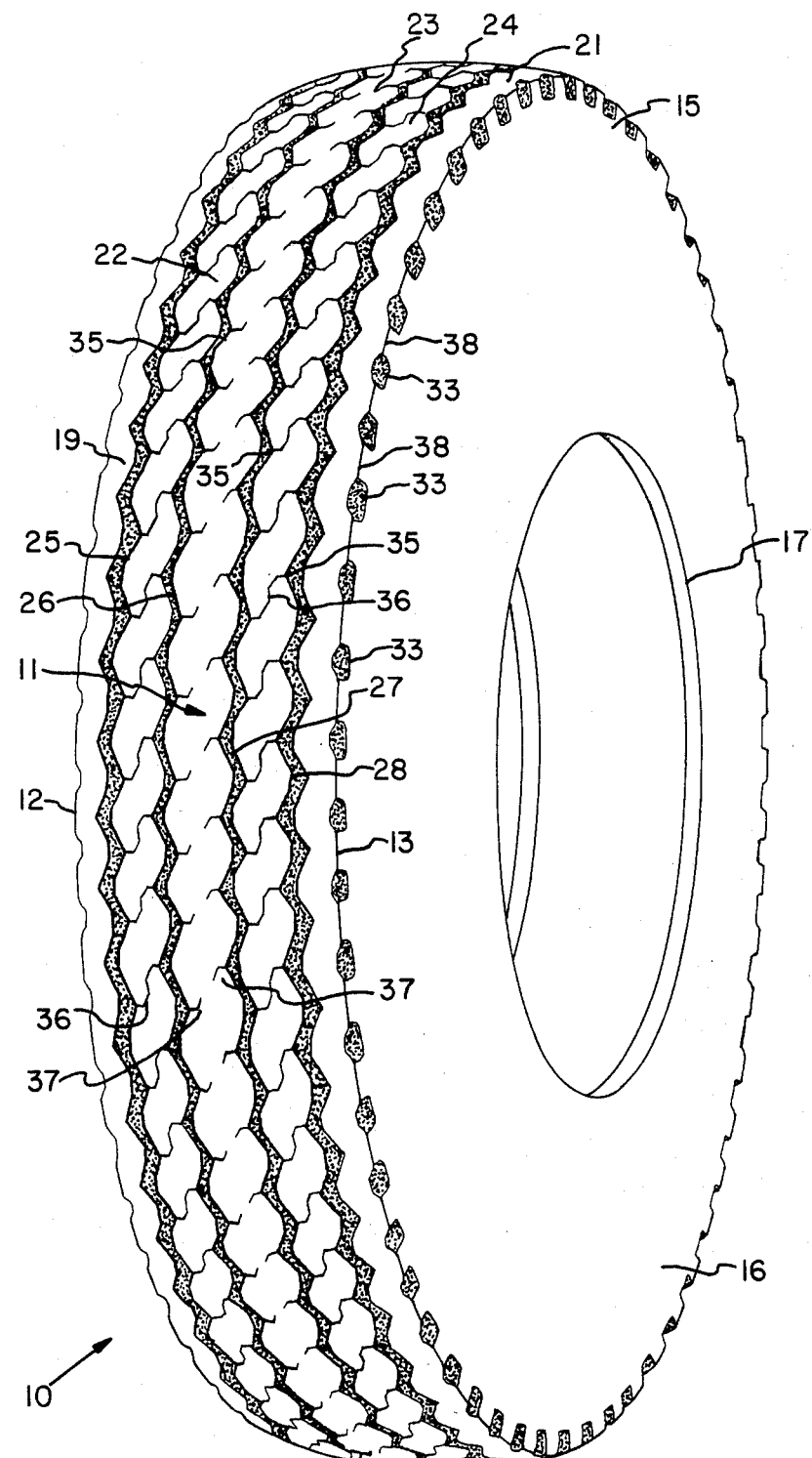
FIG. 1 is a perspective view of a tire according to this invention.
Figure 2:
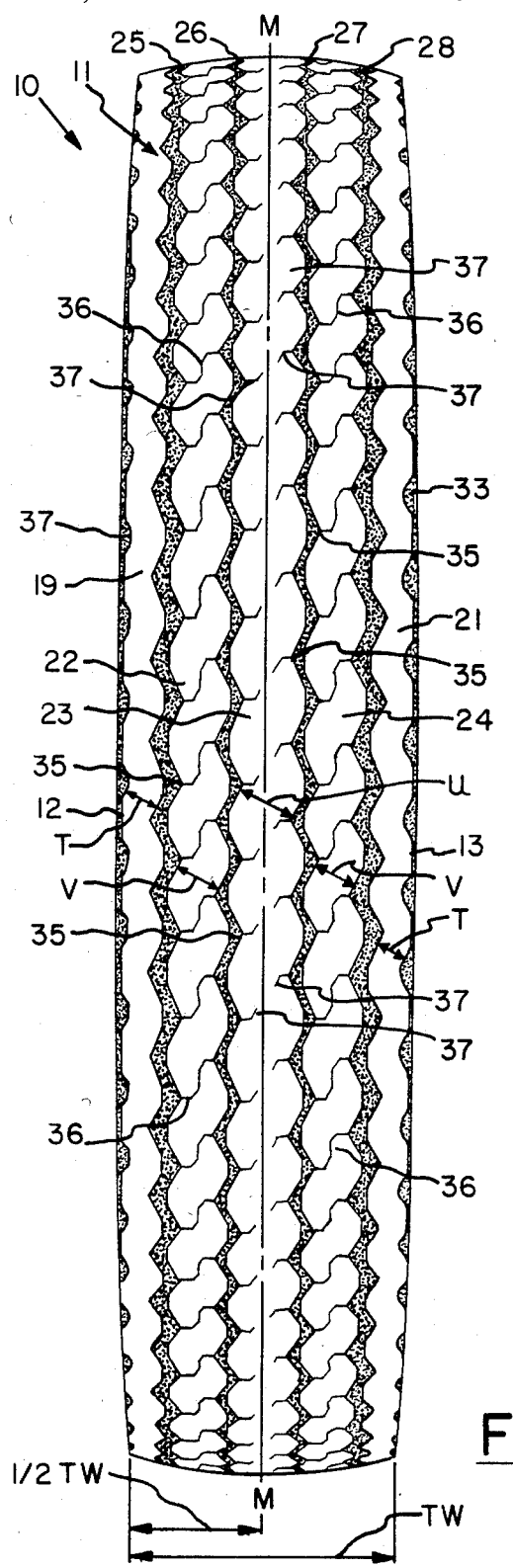
FIG. 2 is a front elevational view of the tire illustrated in FIG. 1.

For the purposes of this invention, the "mid-circumferential plane" of a tire is understood to mean a plane perpendicular to the axis of rotation of a tire disposed midway between the sidewalls of the tire.

DETAILED DESCRIPTION OF THE INVENTION

With reference to FIGS. 1, 2, 3 and 4, there is illustrated a truck tire 10 of bias ply construction for use in highway type applications. The tire 10 has a ground contacting tread 11 that extends circumferentially around the tire. The tread has a pair of lateral edges 12 and 13 axially spaced apart a distance equal to the tread width TW. A shoulder portion 15 extends radially inwardly from each of the lateral edges 12 and 13 of the tread to join a respective sidewall 16. The sidewalls 16 extend radially inwardly from the shoulder portions 15 and each sidewall terminates in a tire bead portion 17. Cross bias plies 20 extend from one bead portion 17 to the other bead portion 17 through the sidewall 16 and under the tread 11 to reinforce the tire.

The ground contacting tread 11 has a rib-type tread pattern which is symmetrical about the mid-circumferential plane M—M of the tire, and which comprises two shoulder ribs 19 and 21 adjacent to the lateral edges 12 and 13 of the tread, and three ribs 22, 23 and 24 spaced axially across the tread between the two shoulder ribs. The ribs 19, 21, 22, 23, and 24 each extend circumferentially around the tire and are separated from each other by circumferentially extending zig-zag grooves 25, 26, 27, and 28. The grooves 26 and 27 on either side of the central rib 23 have a tread depth "x" which is slightly greater than the depth "y" of the other grooves 25 and 28 adjacent to the two shoulder ribs 19 and 21. The term "tread depth" refers to the radial depth of grooves, notches, blades or other indentations as measured on a newly molded tire. It is understood that the tire illustrated in the drawings is merely an example of a tire that may be manufactured according to the invention. A tire in accordance with the scope of the invention may have any number of ribs disposed between the shoulder ribs, may have straight or even sinusoidal shaped circumferential grooves and all of the circumferential grooves may have a uniform tread depth.

The tread 11 is preferably formed has a cap 18 and a base 31 assembly, but could be formed from a single material only. The cap 18 comprises a low modulus elastomeric material having a 300% modulus with a maximum value of about 10 megapascals when vulcanized for 32 minutes at 300° F. (150° C.) as measured according to ASTMS test D412-75, and more preferably has a maximum value of about 5 megapascals.

The shoulder ribs 19 and 21 are each supported on a base 31 of a high tear strength elastomeric material. The bases 31 under each shoulder rib can be axially separated, or as illustrated, can be linked by a bridge portion 32 so that there is a continuous plateau of high tear strength material extending between the two shoulder ribs. The high tear strength material should have a minimum tear strength of 40 AN/m and preferably of the order of 55 KN/m when tested according to ASTMS test D624-73.

Figure 3:
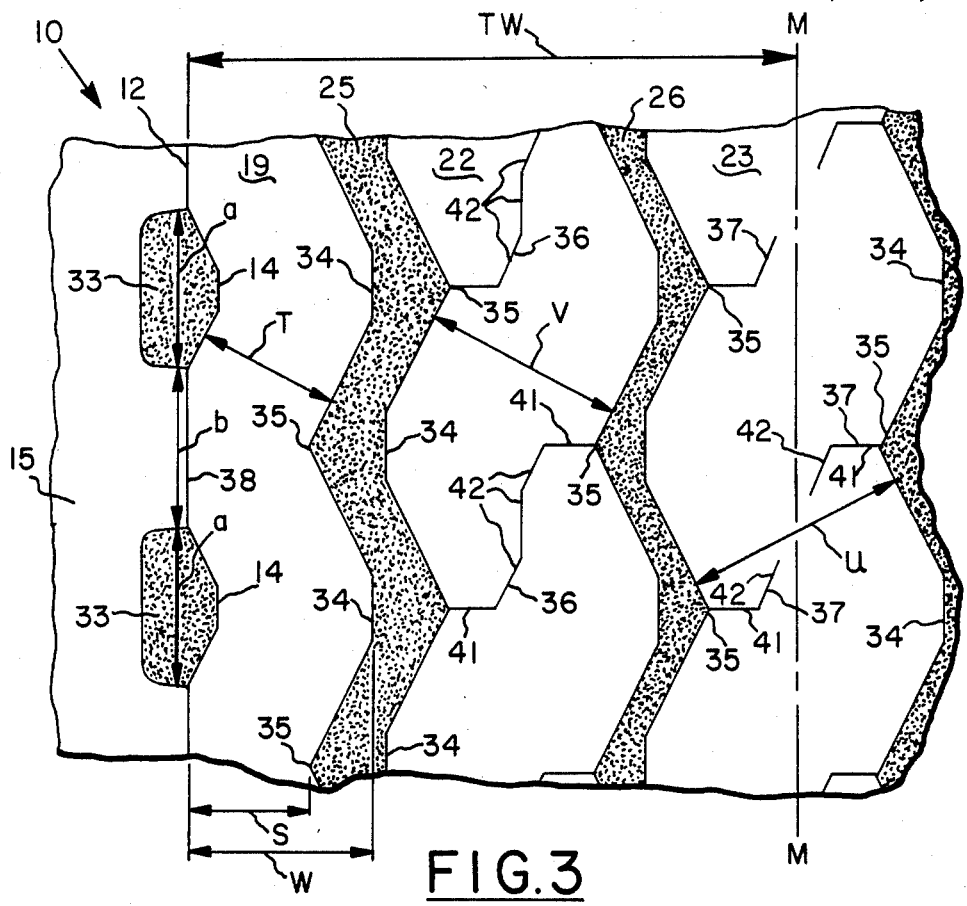
FIG. 3 is an enlarged fragmentary view of a portion of the tread of the tire of FIG. 1 on one side of the mid-circumferential plane of the tire.
Figure 4:
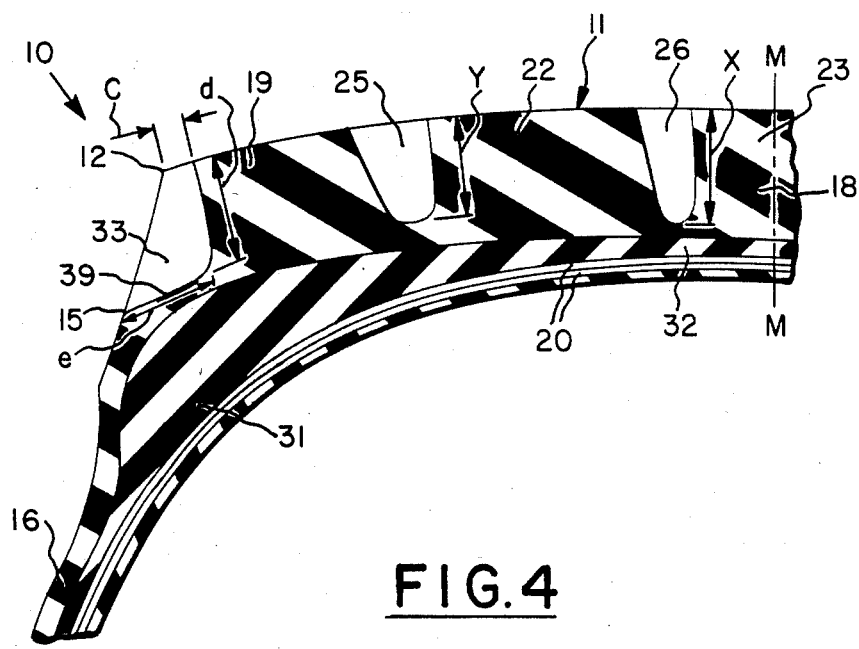
FIG. 4 is a fragmentary radial cross-sectional view through the tire illustrated in FIG. 1 showing the tire on one side only of its mid-circumferential plane.

Each shoulder portion 15 has a plurality of circumferentially spaced notches 33 therein. The notches 33 are circumferentially spaced apart from one another by interposed lands 38. The notches 33 each have the same circumferential width "a" and are separated by lands 38 each of which preferably have the same circumferential width "b", the ratio of the circumferential widths "a" of the notches to the circumferential widths "b" of the circumferentially next adjacent lands must be between 1:0.8 and 1:1.25, and preferably 1:1 as illustrated in FIG. 3. It is understood that if the tread is designed to have a noise pitching sequence in the circumferential direction it may be necessary to vary the circumferential widths of the lands slightly around the tire, while remaining within the critical range of ratios that has already been set forth herein. The circumferential widths of the notches and lands are between 1°-2° of arc of the circumference of the tire tread depending upon the number of pitches around the tread. Each notch 33 extends both axially and radially inwardly from a respective lateral edge of the tread 12 or 13. The axially inward penetration "c" of each notch 33 into the shoulder rib 15 is approximately 2% of the tread width TW at the ground contacting surface of the tread 11 of a newly molded tire, and each notch extends radially inwardly perpendicular to a tangent to the ground contacting surface of the tread for a depth "d" which is substantially equal to the depth "x" of the deepest of the circumferentially extending grooves in the tread. For instance, in the embodiment illustrated in the drawings, the notches have a depth which is substantially the same as that of the grooves 26 and 27 which border the center rib 23. "Substantially the same depth" is understood to mean a difference of no greater than 10% in tread depth. Therefore, in radial cross-section, as shown in FIG. 4, the notches 33 each have a substantially right-angle triangular or preferably trapezoidal cross-section, having a short 4th side at the ground contacting surface of the tread and a base 39 which penetrates into the shoulder rib by an axial distance "e" equal to approximately 6% of the tread width. It is believed that by maintaining the circumferential widths "a" and "b" of the notches 33 and lands 38 at substantially equal values, and further through the deep penetration of the notches 33 into the shoulder ribs, the shoulder ribs 15 are provided with effective cooling during service.

The shoulder ribs 19 and 21 are illustrated in the drawings, for purposes of example only, as being zig-zag ribs having on their axially inner sides flattened out peaks 34 and angled troughs 35 and on their axially outer sides flattened out peaks, comprising the lands 38 and troughs 35 adjacent to the lateral edges of the tread 12 and 13 comprising the notches 33. Each shoulder rib has a maximum axial width W as measured perpendicular to the adjacent lateral edge of the tread of 17% of the tread width TW, and preferably in the range of 14-15% of the tread width TW, and should have a minimum axial width S of 9% of the tread width TW. In an embodiment of the invention having zig-zag shoulder ribs, as illustrated in the drawing, the width T of the shoulder ribs as measured perpendicular to the parallel sides of the shoulder ribs should be between 11% and 12% of the tread width TW.

The three circumferentially extending ribs 22, 23, and 24 are disposed between the shoulder ribs and are shown as having a zig-zag configuration with flattened peaks 34 and angled troughs 35. The exact configuration of the circumferential ribs disposed between the shoulder ribs is not considered to be a limitation upon the practicing of the present invention. However, in the tire illustrated in FIGS. 1 to 4 of the present working example, the rib 23 is located symmetrically at the mid-circumferential plane M—M of the tire, and is flanked on each axial side by one of the ribs 22 or 24. The central rib 23 has a width 'U' as measured between and perpendicular to its parallel sides that is greater than the width 'V' of the two flanking ribs 22 and 24 when measured in a like manner. The width 'U' of the central rib 23 is approximately 21% of the treadwidth TW and the width 'V' of the flanking ribs 22 and 24 is approximately 16% of the treadwidth TW. These three ribs 22, 23, and 24 also have sipes, (otherwise known as blades) 36, 37 therein. The blades 36 in each of the ribs 22 and 24 extend across the whole width of the rib in a series of axial, and circumferential steps, from the trough 35 on one side of the rib to the adjacent trough 35 on the other side of the rib. The circumferential direction of the blades 36 across the rib being such that they take up a substantially 's' shaped configuration. The blades 37 on the central rib 23 each extend from a trough 35 on the rib axially part way across the rib and then extend circumferentially so that blades 37 extending from troughs 35 on opposite sides of the rib take up a substantially broken 'S' configuration. The depth of the blades 36, and 37 is such that the axially directed portions 41 of the blade have a depth of about 80% of the tread depth and the circumferential portions 42 have a depth of about 10% of the tread depth 'x' and are mainly for decorative purposes.

Whilst certain representative embodiments and details have been shown for the purposes of illustrating the invention, it will be apparent to those skilled in the art that various changes could be made without departing from the scope of the invention. For example, the tread pattern could be redesigned with circumferentially interrupted center ribs or the tire could be utilized for non-highway applications. Also it is envisaged that the radial and circumferential dimensions of the notches 33 could be altered so that all the notches are not of the same dimensions, for example during tread pitch variation as is sometimes practiced in the industry for the reduction of the tire noise.

We claim:

1. A bias ply pneumatic tire comprising a tread having a pair of lateral edges with shoulder portions extending radially inwardly from each lateral edge of the tread, said tread having circumferentially extending grooves therein, a pair of shoulder ribs extending circumferentially around the tire and extending axially inwardly from a respective lateral edge of the tread to one of said circumferentially extending grooves and having a maximum axial width of 17% of the tread width, each of said shoulder portions having a plurality of notches therein that are circumferentially spaced apart from each other by lands, each notch extending radially inwardly from the respective lateral edge of the tread to a depth substantially equal to the maximum depth of the deepest of said circumferentially extending grooves, each notch having a substantially right angled triangular cross section with the base of each notch extending into the respective shoulder rib by an axial distance of about 6% of the tread width, said notches and said lands having circumferential widths such that the ratio of the circumferential width of each notch to the circumferential widths of the next adjacent lands is between 1:0.8 and 1:1.25.

2. A bias ply pneumatic tire as claimed in claim 1 wherein the ratio of the circumferential width of each notch to the circumferential widths of the next adjacent lands is 1:1.

3. A bias ply pneumatic tire as claimed in claim 1 wherein all the notches have the same circumferential width.

4. A bias ply pneumatic tire as claimed in claim 1 wherein the circumferential width of each notch is between 1°–2° of arc of the circumference of the tread.

5. A bias ply pneumatic tire as claimed in claim 1 wherein each shoulder rib further comprises a ground contacting surface, and each notch extends axially into the respective shoulder rib at the ground contacting surface by an axial distance of no greater than 2% of the tread width, each notch having a trapezoidal radial cross-section with the shortest side of said cross-section being at the ground contacting surface of the shoulder rib.

6. A bias ply pneumatic tire as claimed in claim 1 wherein the tread comprises a cap of a low modulus first elastomeric material and each shoulder rib is supported on a base of a high tear strength second elastomeric material.

7. A bias ply pneumatic tire as claimed in claim 6 wherein the high tear strength base extends axially under the tread to provide a continuous support for the tread that extends from one shoulder rib to the other shoulder rib.

8. A bias ply pneumatic tire as claimed in claim 1 wherein each shoulder rib has a zig-zag configuration with the axial width of the shoulder rib varying between 9% and 15% of the tread width.

9. A bias ply pneumatic tire as claimed in claim 8 wherein each shoulder rib has a width as measured in a direction perpendicular to opposing parallel sides of the shoulder rib that is between 11% and 12% of the tread width.

* * * * *